US008214880B1

(12) United States Patent
Wu

(10) Patent No.: US 8,214,880 B1
(45) Date of Patent: Jul. 3, 2012

(54) METHODS AND SYSTEMS FOR SECURELY CONFIGURING A NETWORK DEVICE

(75) Inventor: Jingsong Wu, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1383 days.

(21) Appl. No.: 11/472,388

(22) Filed: Jun. 22, 2006

(51) Int. Cl.
H04L 29/06 (2006.01)

(52) U.S. Cl. ............... 726/3; 726/2; 726/27; 709/220; 709/222; 713/1; 713/2; 713/100; 379/15.03; 379/201.12

(58) Field of Classification Search ............... None
See application file for complete search history.

(56) References Cited

U.S. PATENT DOCUMENTS

| | | | |
|---|---|---|---|
| 6,189,101 B1 * | 2/2001 | Dusenbury, Jr. | 726/2 |
| 6,202,159 B1 * | 3/2001 | Ghafir et al. | 726/3 |
| 6,754,820 B1 * | 6/2004 | Scheidt et al. | 713/166 |
| 7,469,338 B2 * | 12/2008 | Buer | 713/170 |
| 7,626,944 B1 * | 12/2009 | Riddle | 370/254 |
| 7,748,035 B2 * | 6/2010 | Nedeltchev et al. | 726/15 |
| 2003/0018889 A1 * | 1/2003 | Burnett et al. | 713/153 |
| 2005/0260973 A1 * | 11/2005 | van de Groenendaal | 455/411 |
| 2006/0005248 A1 * | 1/2006 | Wu et al. | 726/26 |
| 2006/0045267 A1 * | 3/2006 | Moore et al. | 380/247 |
| 2007/0136472 A1 * | 6/2007 | Jardin | 709/226 |
| 2007/0268516 A1 * | 11/2007 | Bugwadia et al. | 358/1.15 |
| 2008/0016347 A1 * | 1/2008 | Maj et al. | 713/168 |
| 2009/0013032 A1 * | 1/2009 | Blatherwick et al. | 709/203 |

OTHER PUBLICATIONS

PAP2T Administration Guide, Linksys, A Division of Cisco Systems, Inc.—Apr. 25, 2006 (119 pages).
A Framework for Session Initiation Protocol User Agent Profile Delivery, draft-ieff-sipping-config-framework-08.txt (40 pages).

* cited by examiner

Primary Examiner — Syed A. Zia

(57) ABSTRACT

In one of many possible embodiments, a system includes a provisioning subsystem communicatively coupled to a network device by a communication network. The provisioning subsystem is configured to incorporate, in a configuration profile, a unique parameter associated with the network device. The configuration profile includes one or more parameters for provisioning the network device to access at least one service provided over the communication network. The provisioning subsystem is further configured to encrypt the configuration profile having the unique parameter and to provide the encrypted configuration profile to the network device. In certain embodiments, the network device is configured to decrypt the encrypted configuration profile and verify that the configuration profile is intended for the network device.

27 Claims, 5 Drawing Sheets

METHODS AND SYSTEMS FOR SECURELY CONFIGURING A NETWORK DEVICE

BACKGROUND INFORMATION

With the advent of packet-switched networks (e.g., the Internet) and other communication technologies, myriad services provided over communication networks are available to consumers. Voice over Internet Protocol ("VoIP") telephone service is one example of such a service. Typically, end users utilize computing devices (e.g., personal computers or Internet Protocol ("IP") based telephones) to access and use network services. End user computing devices are often referred to as customer premises equipment ("CPE").

CPE is often provided to an end user in an unprovisioned state, meaning that the CPE has not yet been configured to access and use the network services. For example, when an end user purchases a Session Initiation Protocol ("SIP") telephone, the telephone has usually not yet been provisioned for the telephone number and/or the particular telephone service features (e.g. call waiting) subscribed to (or that will be subscribed to) by the end user. When the CPE is connected to the service network serving the end user, the CPE may be remotely provisioned for the services subscribed to by the end user.

The provisioning of CPE typically involves one or more configuration files being provided to the CPE over the service network. The CPE is able to use the parameters included in the configuration files to register with the service network and to access and use the services to which the end user subscribes. Configuration files are also used to update the parameters of the CPE. For example, CPE parameters may be updated to reflect a change in the service plan subscribed to by the end user.

The security and cost associated with provisioning CPE are significant concerns of many service providers. Unprotected remote provisioning of CPE provides unscrupulous persons with opportunity for gaining unauthorized access to network services and/or to the CPE. However, there are reasons why remote provisioning is preferred by many service providers, including the substantial costs associated with alternatively pre-provisioning the CPE before it is provided to end users.

Accordingly, service providers have sought to develop different technologies for securing communications related to remote provisioning of CPE. Unfortunately, conventional provisioning technologies are not without shortcomings with respect to security and/or costs. For example, some service providers encrypt configuration files used for remote provisioning of CPE. Encryption generally relies upon an encryption/decryption key, which is commonly known as a symmetric key, or a pair of complementary encryption keys, which are commonly known as a public key and a private key. Decryption keys are provided to the CPE so that provisioning configuration files can be decrypted. However, encryption raises the costs of provisioning, especially when a different decryption key is used for each end user device. The costs are further increased if each different decryption key is preloaded in an end user device before the device is provided to the end user. Of course, these additional costs will almost certainly be passed on to subscribers in one form or another.

Conventional, less-expensive encryption alternatives typically sacrifice security in order to minimize costs. For example, the use of the same decryption key for more than one end user device exposes a service provider to attack. In particular, a computer hacker may be able to copy a configuration file intended for an authorized end user device. Because the same decryption key is shared by more than one end user device, the copy can be used by an unauthorized end user device (having the same decryption key as the authorized end user device) to steal the network services intended for the user of the authorized end user device. This is commonly referred to as theft of service by man-in-the-middle attack.

For at least these reasons, there is a need for systems and methods for securely and cost-effectively configuring network devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Figure 1:
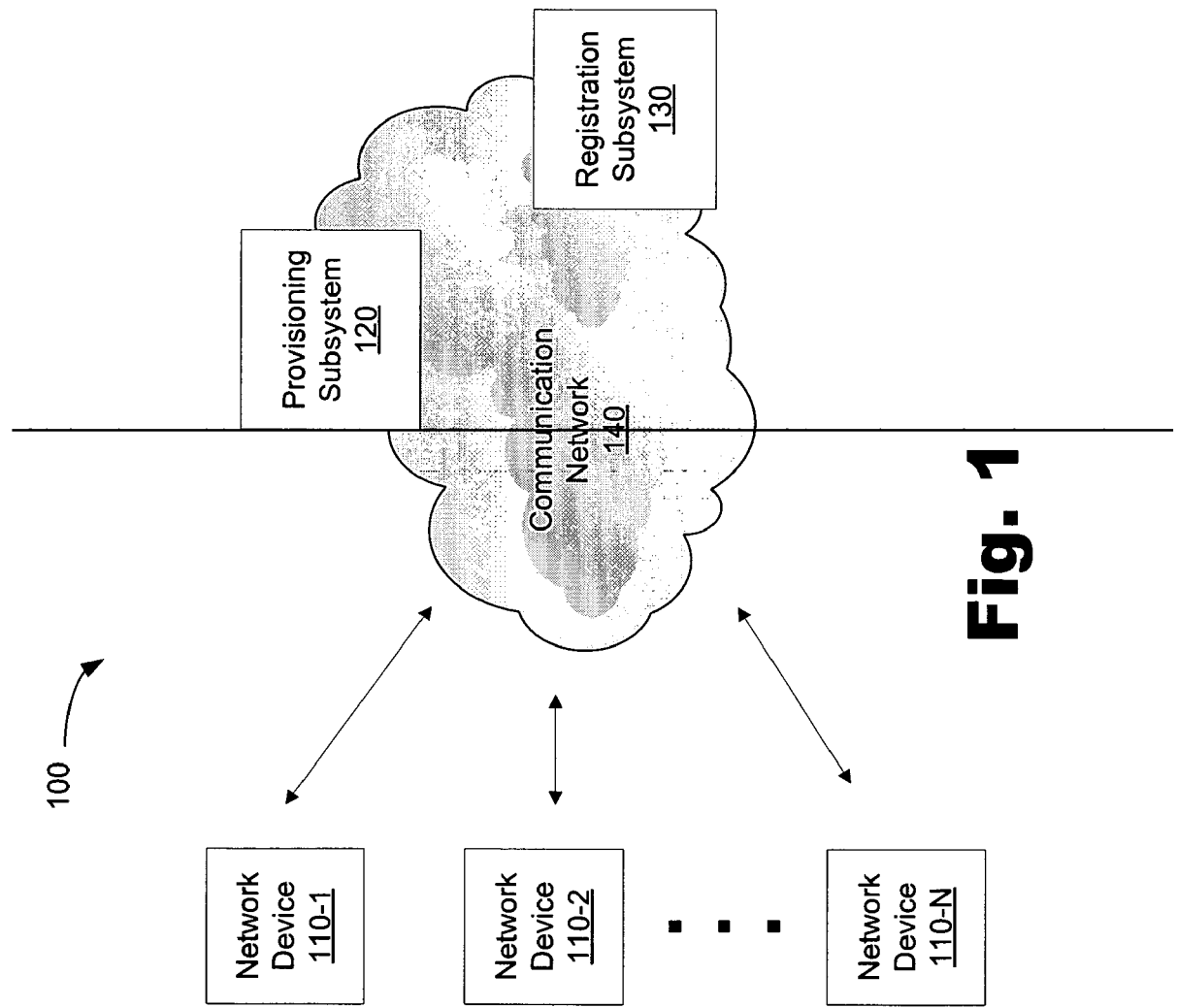
FIG. 1 illustrates an exemplary system for securely configuring a network device, according to an embodiment.

Preferred embodiments according to the present invention may be implemented as systems and methods for securely configuring a network device, including customer premises equipment ("CPE"). In certain embodiments, the network device sends a request to a provisioning subsystem. From the information included in the request, the provisioning subsystem identifies a corresponding configuration profile. The configuration profile is typically encrypted and includes data representative of (or derived from) a parameter that is unique to the network device (i.e., a unique parameter such as the Media Access Control ("MAC") address of the network device). The configuration profile is provided to the network device, which decrypts the configuration profile and verifies that the configuration profile is intended for the network device. In certain embodiments, for example, the network device verifies that the unique parameter included in the configuration profile matches internal data representative of the unique parameter. When a match is verified, the network device loads the configuration profile and is thereby configured to register for accessing one or more network services. As used herein, the term "load," as used to refer to the configuration profile being loaded by the network device, refers to the parameters in the configuration profile being used or usable by the network device for accessing one or more network services.

If the encrypted configuration profile (or a copy thereof) is somehow received by a second network device having a different unique parameter, the second network device will be unable to load the configuration profile because the unique parameter included in the configuration profile will not match the different unique parameter associated with the second network device. Consequently, the second network device will be unable to use the configuration profile targeted for the first network device to access network services.

The inclusion of a unique network device parameter in a configuration profile is designed to ensure that the configuration profile can be loaded only by the network device intended to receive the configuration profile. Security is further enhanced by encrypting the configuration profile, including the unique parameter included in the configuration profile. Because the unique parameter is used to prevent unauthorized network devices from loading a configuration profile intended for another network device, the same decryption key can be used for more than one network device without exposing the network devices or network services to man-in-the-middle theft of service attacks. Accordingly, the costs and complexities associated with using a unique decryption key for each network device can be avoided, without risking exposure to man-in-the-middle theft of service attacks.

Components and functions of exemplary embodiments of systems and methods for securely configuring a network device will now be described in detail.

II. Exemplary System

Turning now to the figures, FIG. 1 illustrates an exemplary system 100 for securely configuring a network device, according to one embodiment. As shown in FIG. 1, the system 100 may include one or more network devices 110-1 through 110-N (collectively referred to as "the network devices 110") communicatively coupled to a provisioning subsystem 120 and a registration subsystem 130 by a communication network 140.

The elements of the system 100 may communicate using any known communication technologies, devices, media, and protocols supportive of voice and/or data communications, including, but not limited to, the Internet, intranets, local area networks, Voice over Internet Protocol ("VoIP") networks, packet-switched networks, circuit-switched networks, other communications networks, data transmission media, communications devices, Transmission Control Protocol ("TCP"), Internet Protocol ("IP"), File Transfer Protocol ("FTP"), Trivial File Transfer Protocol ("TFTP"), User Datagram Protocol ("UDP"), telnet, Hypertext Transfer Protocol ("HTTP"), Hypertext Transfer Protocol Secure ("HTTPS"), socket connections, and other suitable communications technologies.

The provisioning subsystem 120 is able to provide the network devices 110 with encrypted configuration profiles having unique parameters corresponding to respective ones of the network devices 110. Before a configuration profile can be loaded by a network device 110, the profile is decrypted and at least one unique parameter included in the configuration profile is verified by the network device 110 as matching internal data representative of the unique parameter.

While an exemplary system 100 is shown in FIG. 1, the exemplary components illustrated in the Figure are not intended to be limiting. Indeed, other alternative hardware environments and implementations may be used, as is well known. Each of the components of the system 100 will now be described in additional detail.

A. Communication Network

The communication network 140 may include any devices, media, and other network technologies for enabling communications between the network devices 110 and the provisioning subsystem 120 and registration subsystem 130, as represented by the arrows illustrated in FIG. 1. In certain embodiments, the communication network 140 supports voice and/or data communications between the elements of the system 100. The communication network 140 may include, but is not limited to, the Internet, intranets, local area networks, wide area networks, packet-switched networks (e.g., Voice over Internet Protocol ("VoIP") networks), circuit-switched networks (e.g., the Public Switched Telephone Network ("PSTN")), and integrated packet-switched and circuit-switched networks (e.g., integrated VoIP and PSTN networks).

One or more service providers provide network services over the communication network 140. Examples of the network services include, but are not limited to, voice services (e.g., Plain Old Telephone Service ("POTS"), VoIP telephone services, and long-distance telephone services), data services, network access services (e.g., Internet access services), content delivery services, media content services (e.g., audio, video, or audiovisual programming), subscription services, and any other services that may be provided over a network.

B. Registration Subsystem

The registration subsystem 130 may include any suitable communication technologies for communicating with the network devices 110 over the communication network 140 and may comprise any combination of hardware, software, and firmware configured for registering network devices 110 for accessing services provided over the communication network 140, as is well known. In other words, the registration subsystem 130 is configured to control access to the services provided over the communication network 140. Accordingly, network devices 110 register with the registration server 130 in order to gain access to network services. In certain embodiments, the registration subsystem 130 is implemented on or includes one or more registration servers.

C. Network Devices

The network devices 110 may include any device or devices capable of accessing one or more network services provided over the communication network 140 and/or any device or devices capable of communicating with the provisioning subsystem 120 over the communication network 140. For example, the network devices 110 may include, but are not limited to, one or more desktop computers, laptop computers, tablet computers, handheld devices, personal data assistants, mobile telephones (e.g. cellular telephones), IP-enabled devices (e.g., IP telephones), session initiation protocol ("SIP") enabled devices (e.g., SIP telephones), mobile IP telephones, mobile SIP telephones, Voice over Internet Protocol ("VoIP") enabled devices, analog telephone adaptors ("ATAs"), satellite pagers, wireless internet devices, embedded computers, video phones, mainframe computers, mini-computers, servers, gateways, routers, switches, workstations, network interface cards, programmable logic devices, entertainment devices, gaming devices, computing devices operating softphones, and any other device capable of accessing network services over the communication network 140. The network devices 110 may include various peripherals such as a terminal, keyboard, keypad, mouse, screen, printer, stylus, input device, output device, microphone, speaker, sound card, or any other apparatus or interface that can facilitate use of the network devices 110 by human operators.

In certain embodiments, each of the network devices 110 includes one or more unique parameters associated with the network device 110. As used herein, the term unique parameter refers to any parameter associated with and useful for uniquely identifying a network device 110 on the communication network 140. In certain embodiments, the unique parameters include Media Access Control ("MAC")

addresses associated with the network devices 110. As is known, the MAC address is a hardware address that uniquely identifies each node of a network. Of course, any other parameters included in the network devices 110 and that uniquely identify each of the network devices 110 on the communication network 140 may be used, including device serial numbers, manufacturer names, and model identifiers. Examples of unique parameters being used to control the loading of configuration profiles will be described further below.

In certain embodiments, each of the network devices 110 includes an encryption/decryption key (referred to as the "decryption key") useful for encrypting and/or decrypting messages sent to and/or received from the provisioning subsystem 120. Among other uses, the decryption keys are useful for decrypting configuration profiles encrypted by and received from the provisioning subsystem 120.

The network devices 110 may be manufactured by one or more third parties, and a service provider may instruct any of the third parties to preload a decryption key in each of the network devices 110. This allows communications associated with both the initial provisioning and any subsequent provisionings of each of the network devices 110 to be encrypted. In addition or as an alternative to the preloading of decryption keys, decryption keys may be downloaded to the network devices 110 over the communication network 140.

In certain embodiments, each of the network devices 110 includes a common (i.e., the same) decryption key. The use of a common decryption key across the network devices 110 reduces manufacturing costs and complexities as compared to the use of a unique decryption key for each of the network devices 110.

Alternatively, different groups of the network devices 110 may include different decryption keys. For example, network devices 110 manufactured by a first party may include a first decryption key, and network devices 110 manufactured by a second party may include a second decryption key. This is still more cost effective than using a unique decryption key for each of the network devices 110.

It is also anticipated that a unique decryption key may be preloaded and/or downloaded in each of the network devices 110 for implementations in which security concerns outweigh concerns with cost.

The network devices 110 may be provided to subscribers in an unprovisioned state. Accordingly, the network devices 110 are preconfigured to communicate with the provisioning subsystem 120 when connected to the communication network 140. For example, a network address (e.g., a Uniform Resource Locator ("URL") or Fully Qualified Domain Name ("FQDN")) associated with the provisioning subsystem 120 may be preloaded in the network devices 110 such that the network devices 110 are able to send messages to the provisioning subsystem 120 when connected to the communication network 140.

When communications between the network devices 110 and the provisioning subsystem 120 have been established, the network devices 110 are prepared to be provisioned by receiving, verifying, and loading configuration profiles received from the provisioning subsystem 120. The decryption keys included in the network devices 110 allow data communicated between the network devices 110 and the provisioning subsystem 120 to be encrypted. Moreover, the use of unique device parameters in configuration profiles provides an additional level of security that generally ensures that configuration profiles are loaded only by the targeted respective network devices 110, as described further below.

D. Provisioning Subsystem

The provisioning subsystem 120 may include any suitable communication technologies for communicating with the network devices 110 over the communication network 140 and may comprise any combination of hardware, software, and firmware configured for provisioning the network devices 110 for accessing services provided over the communication network 140. In certain embodiments, the provisioning subsystem 120 is implemented on or includes one or more provisioning servers.

The provisioning subsystem 120 may include and/or generate configuration profiles (e.g., one or more configuration data files) having parameters that when loaded by the network devices 110, configure the network devices 110 for particular services and/or service features provided over the communication network 140. As is well-known, configuration profiles may be defined to provide access to particular services or service packages that correspond with respective service subscriptions. For instance, a first subscriber may order a first service package from a service provider. The service provider creates a subscription profile descriptive of the features and services to be provided to the subscriber under the subscription. A configuration profile is created and includes parameters that correspond with the subscription profile such that when the configuration profile is received and loaded by a particular network device 110, the network device 110 is provisioned to access the services and features included in the subscription.

The configuration profiles are defined to include unique parameters associated with respective network devices 110. In certain embodiments, for example, a unique parameter associated with a particular network device 110 is inserted into a predefined field (e.g., a unique identifier field such as a MAC field) of the configuration profile associated with the same network device 110.

The provisioning subsystem 120 may create configuration profiles having unique parameters at any suitable times or in response to predefined events (e.g., receipt of requests from network devices 110). In certain embodiments, the provisioning subsystem 120 is configured to generate configuration profiles in response to receiving activation requests from users associated with the network devices 110. For example, a user may subscribe to one or more network services provided over the communication network 140. The user is provided with or otherwise obtains a particular network device 110 for accessing the network services. The user may activate the network device 110, including providing a unique identifier associated with the network device 110 to the provisioning subsystem 120. This may be done in any suitable manner such as the user accessing the provisioning subsystem 120 over the communication network 140 and providing one or more messages including the unique identifier. In certain embodiments, for example, the user is able to provide the unique identifier through a web portal hosted by the provisioning subsystem 120. Of course, any other suitable way of providing the unique parameter to the provisioning subsystem 120 may be used, including, but not limited to using a telephone call, a text message, or an e-mail message to communicate the unique parameter to the provisioning subsystem 120. The user may use the network device 110 or any other suitable device to provide the unique parameter to the provisioning subsystem 120.

The provisioning subsystem 120 is configured to use data included in activation requests to generate configuration profiles having unique identifiers included therein. In particular, the provisioning subsystem 120 is configured to incorporate unique identifiers associated with network devices 110 into the configuration profiles, as described above.

The provisioning subsystem 120 may include one or more encryption keys (e.g., private keys) for encrypting configuration profiles. In certain embodiments, the provisioning subsystem 120 is able to use a single encryption key for encrypting configuration profiles for all of the network devices 110. In other embodiments, the provisioning subsystem 120 uses multiple encryption keys for encrypting configuration profiles for the network devices 110.

The provisioning subsystem 120 may store the configuration profiles having unique parameters for future use, including providing the configuration profiles to respective network devices 110 in response to receiving provisioning requests from the network devices 110. Additionally or alternatively, the provisioning subsystem 120 may be configured to provide configuration profiles to respective network devices 110 periodically or in response to other predefined events such as the updating of configuration profiles.

The provisioning subsystem 120 may receive provisioning requests from the network devices 110 over the communication network 140. From data included in the provisioning requests, the provisioning subsystem 120 can identify corresponding configuration profiles to be provided to the network devices 110. In certain embodiments, for example, a provisioning request received from a network device 110 includes a name of a configuration file, where the name of the file includes the MAC address of, or other unique identifier associated with, the network device 110 and an indication of the type of file (e.g., "<mac>.cfg" where "<mac>" is the MAC address of the network device 110). Of course, other suitable identifiers (e.g., subscriber or subscription identifiers) may be used to identify corresponding configuration profiles.

The provisioning subsystem 120 is configured to provide the identified configuration profiles having unique parameters to the corresponding network devices 110. The configuration profiles may be transmitted to the network devices 110 over the communication network 140. As described below, a network device 110 in receipt of a configuration profile is configured to verify that the received configuration profile is intended for the network device 110 before the configuration profile can be loaded.

The provisioning subsystem 120 is not limited to generating and providing configuration profiles having unique network device parameters in the manner described above. For example, if the provisioning subsystem 120 does not include a pre-generated configuration profile requested in a provisioning request received from a particular network device 110, the provisioning subsystem 120 may be configured to dynamically generate the configuration profile in response to the provisioning request, including inserting a unique parameter in the configuration profile. The unique parameter may have been previously received and stored by the provisioning subsystem 120, or the provisioning subsystem 120 may identify the unique parameter from data included in the provisioning request. Configuration profiles may also be dynamically encrypted.

III. Exemplary System Operation

Figure 2:
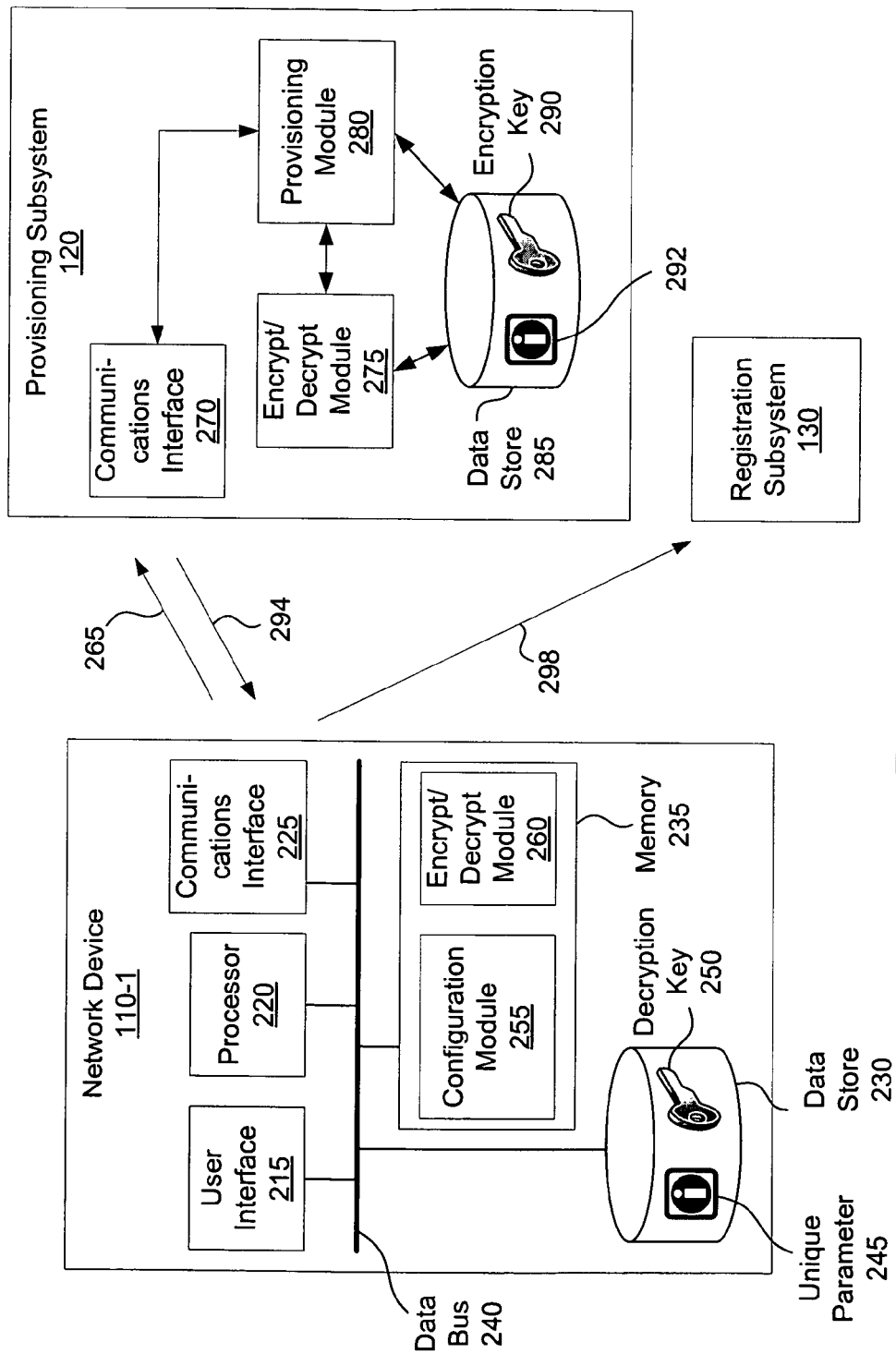
FIG. 2 illustrates exemplary communications between, as well as exemplary components of, certain elements of the system of FIG. 1, according to an embodiment.

An exemplary provisioning of network device 110-1 will now be described in relation to FIG. 2. FIG. 2 illustrates exemplary communications between, as well as exemplary components of, certain elements of the system 100, according to an embodiment.

As shown in FIG. 2, network device 110-1 may include a user interface 215, processor 220, communications interface 225, data store 230, and memory 235 communicatively coupled to one another by a data bus 240. The user interface 215 may include any suitable technologies for facilitating communications with a user of the network device 110-1, and the communications interface 225 may include any suitable technologies for facilitating communications with the provisioning subsystem 120.

The data store 230 and the memory 235 may include any suitable technologies for storing and accessing electronic data, including one or more databases and caches, for example. The data store 230 may include data representative of a unique parameter 245 and a decryption key 250, and the memory 235 may include a configuration module 255 and an encrypt/decrypt module 260 (also referred to as the "encryption module 260").

The processor 220 is configured to perform the operations of the network device 110-1 described herein. The processor 220 may execute computer-readable instructions stored in the data store 230 and/or the memory 235, as is well known. In particular, the processor 220 may perform computer-readable instructions (e.g., software applications) associated with the configuration module 255 and the encrypt/decrypt module 260.

In association with subscribing to network services provided over the communication network 140, a user of the network device 110-1 typically activates the network device 110-1. This typically includes the user providing the unique identifier 245 to the provisioning subsystem 120, which may be done in any of the ways described above.

A configuration profile for the network device 110-1 may be defined using subscription parameters associated with the network services and features subscribed to by the user of the network device 110-1 and the unique identifier 245 provided to the provisioning subsystem 120. The configuration profile may be defined in any of the ways described above, and may be accomplished by manual, automatic, or a combination of manual and automatic procedures. Typically, the configuration profile is assigned an identifier (e.g., a profile name) that includes or is based on the unique parameter 245.

As shown in FIG. 2, the provisioning subsystem 120 includes a communication interface 270, an encrypt/decrypt module 275 (also referred to as the "encryption module 275"), a provisioning module 280, and a data store 285 communicatively coupled to one another as shown. The data store 285 may include an encryption key 290. The communications interface 270 may receive the activation request and provide the request to the provisioning module 280 for further processing. The provisioning module 280 may be configured to generate, or at least help generate, the configuration profile for the network device 110-1.

The configuration profile having the unique identifier 245 may be provided to the encrypt/decrypt module 275, which can use the encryption key 290 to encrypt the configuration profile. In certain embodiments, the encrypted configuration profile is stored to the data store 285. In other embodiments, the configuration profile may be stored in the data store 285 prior to being encrypted. Either way, the configuration profile is ready to be retrieved and used to provision the network device 110-1 for accessing the network services subscribed to by the user of the network device 110-1. The configuration profile for the network device 110-1 stored in the data store 285 is represented by reference numeral 292.

Network device 110-1 may initiate a provisioning operation by sending a provisioning request 265 to the provisioning subsystem 120. The configuration module 255 may generate the request 265, which may be transmitted to the provisioning subsystem 120 by way of the communications interface 225. The request 265 may include, among other information, data representative of or derived from the unique parameter 245, which is useful for identifying the network device 110-1 and the configuration profile associated with the network device 110-1. In certain embodiments, the unique parameter 245 includes the MAC address of the network device 110-1 on the communication network 140.

The provisioning subsystem 120 is configured to receive the provisioning request 265. More specifically, the communications interface 270 may receive and forward the request 265 to the provisioning module 280 for further processing.

The provisioning module 280 is configured to use the data included in the request 265 to identify an appropriate configuration profile (or configuration profiles) to be provided to the network device 110-1 in response to the request 265. For example, the provisioning module 280 may use the unique parameter 245, or data derived from the unique identifier 245, included in the request 265 as a parameter for searching the data store 285 for one or more configuration profiles (e.g., configuration profile 292) that have been predefined as being associated with the unique parameter 245. In this manner, the provisioning subsystem 120 is able to identify the configuration profile that includes parameters representative of appropriate settings that will allow the network device 110-1 to access the specific network services and features subscribed to by the user of the network device 110-1.

In embodiments in which the configuration profile 292 has been encrypted previous to the receipt of the provisioning request 265, the identified configuration profile 292 may be retrieved and provided to the communications interface 270 for transport to the network device 110-1. In embodiments in which the configuration profile 292 has not been encrypted previous to the receipt of the provisioning request 265, the configuration profile 292 may be retrieved and dynamically encrypted before being provided to the network device 110-1. For example, the provisioning module 280 may send the configuration profile 292 to the encrypt/decrypt module 275, which uses the encryption key 290 to encrypt the configuration profile 292 and returns the encrypted configuration profile 292 to the provisioning module 280.

Regardless of the point at which the configuration profile 292 is encrypted, the unique parameter 245 included therein is also encrypted as part of the configuration profile. Any suitable encryption technologies may be used to encrypt (and decrypt) configuration profiles, including Advanced Encryption Standard ("AES").

Once the appropriate configuration profile (e.g., configuration profile 292) has been identified and encrypted (either previously or dynamically), the provisioning subsystem 120 sends the encrypted configuration profile having the unique parameter 245 to the communications interface 270, which is configured to send the encrypted configuration profile to the network device 110-1 over the communication network 140, as represented by arrow 294 in FIG. 2.

If a matching configuration profile is not found in the data store 285, the provisioning module 280 may be configured to search an external data source for a subscription, subscriber, or configuration profile associated with the unique parameter 245 included in the request 265. If a subscription or subscriber profile is found, the provisioning module 280 and the encrypt/decrypt module 275 may be configured to use the profile to dynamically generate and encrypt a configuration profile having the unique identifier 245 included therein.

The communications interface 225 of the network device 110-1 receives the encrypted configuration profile, which is decrypted by the encrypt/decrypt module 260 using the decryption key 250. The configuration module 255 is able to process the decrypted configuration profile, including identifying the unique parameter 245 included in the configuration profile. The configuration module 255 then verifies that the configuration profile is intended for the network device 110-1. This may be done by comparing the unique parameter 245 included in the configuration profile with the unique parameter 245 stored internally in the network device 110-1 (i.e., in the data store 230 or the memory 235) to verify that they are the same. If a match is verified, the configuration module 255 loads the configuration profile to configure the network device 110-1 for accessing network services. With the configuration profile loaded, the network device 110-1 is able to communicate with the registration server 130 as represented by arrow 298 to initiate registration of the network device 110-1 for accessing network services over the communication network 140, as is well known.

FIG. 2 illustrates a legitimate provisioning operation in which the targeted network device 110-1 receives the appropriate configuration profile having a matching unique parameter 245 associated with the network device 110-1. If another network device such as network device 110-2 were to somehow receive the encrypted configuration profile intended for network devices 110-1, or a copy thereof, the system 100 will use the unique parameter 245 included in the configuration profile to prevent the network device 110-2 from loading the configuration profile.

Figure 3:
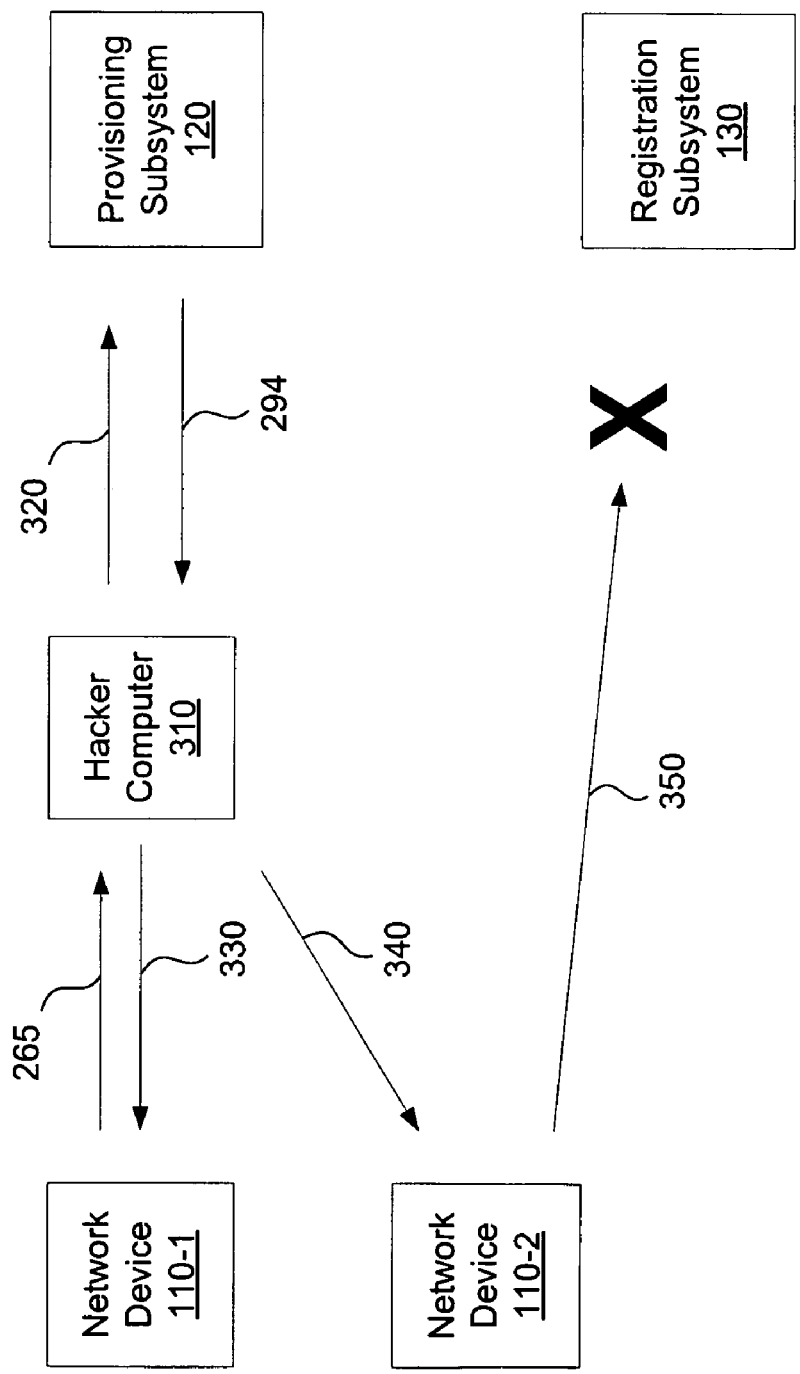
FIG. 3 illustrates exemplary communications between certain elements of the system of FIG. 1 in relation to an attempted theft of service, according to an embodiment.

For example, FIG. 3 illustrates exemplary communications between certain elements of the system 100 in relation to an attempted theft of service, according to an embodiment. As shown in FIG. 3, network device 110-1 sends the request 265 to the provisioning subsystem 120. Another computing device such as a hacker computer 310 may intercept the request 265 and then forward the request 265 to the provisioning subsystem 120, as represented by arrow 320. The provisioning subsystem 120 functions as described above to provide the encrypted configuration profile having the unique identifier 245 included therein to the network device 110-1, as represented by arrow 294. The hacker computer 310 intercepts and makes a copy of the encrypted configuration profile. The hacker computer 310 forwards the encrypted configuration profile to the network device 110-1, as represented by arrow 330. The network device 110-1 may process the encrypted configuration profile as described above.

Although the hacker computer 310 may not be able to decrypt the encrypted configuration profile intended for network device 110-1, another network device such as network device 110-2 having the decryption key 250 may be used to decrypt the profile. Such devices may be available especially where the network devices 110 are mass produced with a common decryption key.

Accordingly, the hacker computer 310 may send a copy of the encrypted configuration profile to network device 110-2, as represented by arrow 340. The network device 110-2 can use its own decryption key 250 to decrypt the copy of the encrypted configuration profile. However, the network device 110-2 will be prevented from loading the decrypted configuration profile because the unique parameter 245 included in the configuration profile does not match the unique parameter stored internally in the network device 110-2. For example, where the unique parameter 245 in the configuration profile includes the MAC address for the network device 110-1, the MAC address for the network device 110-2 will not match, and the network device 110-2 will be prevented from loading the configuration profile.

When the unique parameter included in a configuration profile does not match the unique parameter stored internally in a network device such as the network device 110-2, the configuration module 255 of the device 110-2 will not load the configuration profile. An error message may be generated, such as a message indicating that there is an error with the configuration profile.

In the above-described manner, device-specific configuration profiles are used to prevent unauthorized network devices from loading configuration profiles intended for another network device. Consequently, network device 110-2 is unable to use the configuration profile intended for network device 110-1 to register with the registration subsystem 130 and gain access to network services subscribed to by a user of the network device 110-1, as represented by the blocked arrow 350 shown in FIG. 3. In other words, the use of device-specific configuration profiles can prevent external attacks, including man-in-the-middle theft of service attacks.

In the above-described operation, the request 265 includes data representative of the unique parameter 245. However, this is not limiting. As an example of one alternative, data that is derived from the unique parameter 245 may be included in a request sent to the provisioning subsystem 120. For example, each of the network devices 110 may be configured with a derivation heuristic that accepts the unique parameter associated with the device as input and derives output data based on the unique parameter. The provisioning subsystem 120 may be configured with a reverse derivation heuristic configured to accept the derived data included in the request as input and to derive the unique parameter from the data. The inclusion of derivation heuristics in the network devices 110 and a reverse derivation heuristic in the provisioning subsystem 120 adds yet another level of security to provisioning operations performed by the system 100.

However, the provisioning subsystem 120 may be configured to verify the derived data included in the request in other ways that do not use a reverse derivation heuristic. For example, the provisioning subsystem 120 may be configured with the derivation heuristic. Accordingly, the provisioning subsystem 120 can apply the derivation heuristic to the unique parameter, which was previously received from the corresponding network device 110. The result is compared to the derived data included in the request to verify a match. If a match is identified, the unique parameter is authenticated. The inclusion of a derivation heuristic in the network devices 110 and the provisioning subsystem 120 is another way to provide an added level of security to provisioning operations performed by the system 100.

While the above-described operation is described in the context of network device 110-1 sending provisioning request 265 to the provisioning subsystem 120, this is not limiting. The provisioning subsystem 120 may be configured to initiate subsequent provisioning of one or more of the network devices 110 periodically or in response to predefined events, including updates being made to subscription, subscriber, or configuration profiles. Subsequent provisioning operations may also utilize the unique parameters associated with the network devices 110 for security purposes in the same or similar manner as described above. For instance, the provisioning subsystem 120 may be configured to store received unique parameters such that the unique parameters may be incorporated into configuration profiles used in subsequent provisioning operations.

IV. Exemplary Process Views

Figure 4:
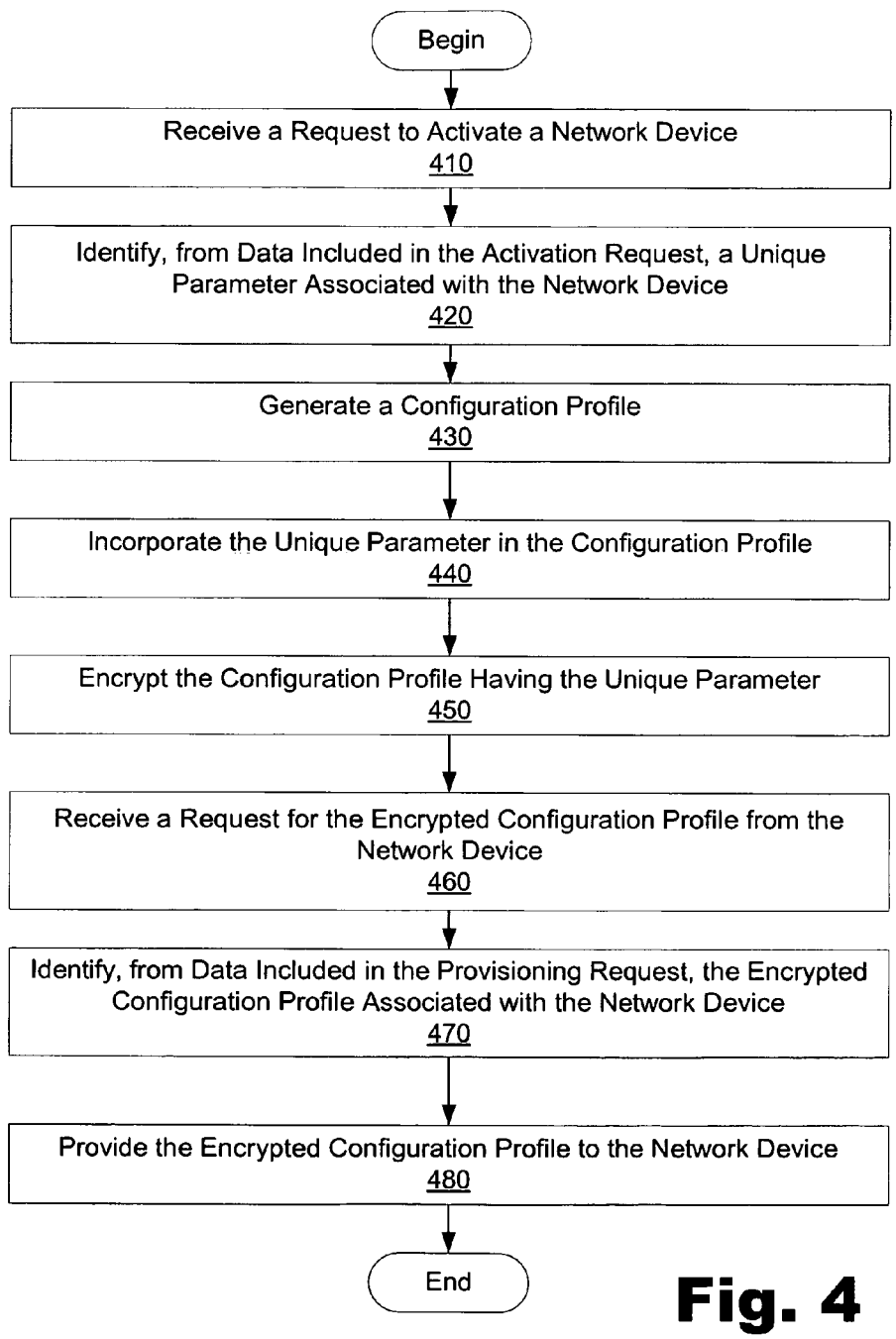
FIG. 4 is a flowchart illustrating an exemplary process performed by the provisioning server of FIG. 1 for securely configuring a network device, according to an embodiment.

FIG. 4 illustrates an exemplary method of a provisioning subsystem (e.g., provisioning subsystem 120) functioning to securely configure a network device, according to an embodiment. While FIG. 4 illustrates exemplary steps according to one embodiment, other embodiments may omit, add to, and/or modify any of the steps shown in FIG. 4.

In step 410, a request to activate a network device is received. The activation request includes a unique parameter associated with the network device and may be provided in any of the ways described above, including a user of the network device providing the activation request to the provisioning subsystem 120.

In step 420, the unique parameter associated with the network device is identified from data included in the activation request. Step 420 may be performed in any of the ways described above.

In step 430, a configuration profile is generated. Step 430 may be performed in any of the ways described above, including the provisioning subsystem 120 generating the configuration profile based at least in part on data included in the activation request.

In step 440, the unique parameter is incorporated in the configuration profile. Step 440 may be performed in any of the ways described above, including inserting data representative of the unique parameter into a field of the configuration profile.

In step 450, the configuration profile having the unique parameter is encrypted. Step 450 may be performed in any of the ways described above.

In step 460, a request for the encrypted configuration profile is received from the network device. Step 460 may be performed in any of the ways described above, including the provisioning subsystem 120 receiving provisioning request 265 from network device 110-1 over the communication network 140.

In step 470, the encrypted configuration profile associated with the network device is identified from data included in the provisioning request. Step 470 may be performed in any of the ways described above, including using data representative of the unique parameter included in the provisioning request to identify the configuration profile.

In step 480, the encrypted configuration profile is provided to the network device. Step 480 may be performed in any of the ways described above, including transmitting the encrypted configuration profile over the communication network 140.

Any of the steps 410-480 may be repeated for subsequent activation and/or provisioning operations related to the network device. For example, the configuration profile may be updated and steps 460-480 repeated to provide the updated configuration profile to the network device.

The steps shown in FIG. 4 may be performed in different orders than that shown in the Figure. For example, encryption (step 450) of the configuration profile may be performed either before or after receipt of the provisioning request (step 460). By way of another example, steps 430-450 may be performed after receipt of the provisioning request (step 460).

Figure 5:
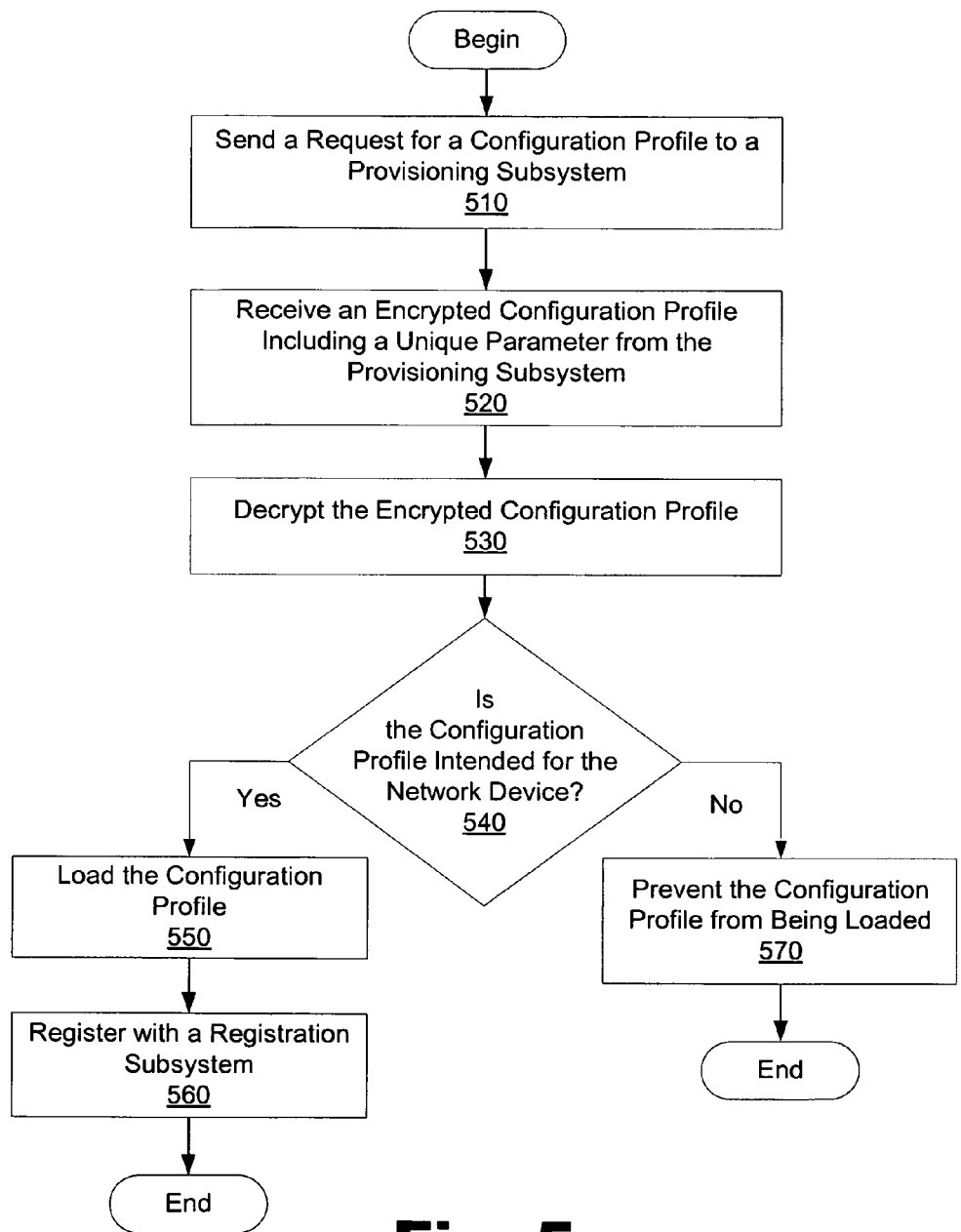
FIG. 5 is a flowchart illustrating an exemplary process performed by a network device of FIG. 1 for securely configuring the network device, according to an embodiment.

FIG. 5 illustrates an exemplary method of a network device functioning to securely configure the network device, according to an embodiment. While FIG. 5 illustrates exemplary steps according to one embodiment, other embodiments may omit, add to, and/or modify any of the steps shown in FIG. 5.

In step 510, a request for a configuration profile is sent to a provisioning subsystem. Step 510 may be performed in any of the ways described above, including network device 110-1 sending request 265 to the provisioning subsystem 120 over the communication network 140.

In step 520, an encrypted configuration profile including a unique parameter is received from the provisioning subsystem. Step 520 may be performed in any of the ways described above, including the network device 110-1 receiving an encrypted configuration profile from the provisioning subsystem 120.

In step 530, the encrypted configuration profile is decrypted. Step 530 may be performed in any of the ways described above, including using decryption key 245 to decrypt the encrypted configuration profile.

In step 540, it is determined whether the configuration profile is intended for the network device. Step 540 may be performed in any of the ways described above, including determining whether the unique parameter included in the configuration profile matches the unique parameter stored internally by the network device. Step 540 provides a device-specific level of security designed to ensure that a configuration profile can be loaded only by the intended recipient of the profile. If a match is found in step 540, processing continues at step 550.

In step 550, the network device loads the configuration profile. Step 550 may be performed in any of the ways described above, including the processor 220 executing instructions included in the configuration module 255, as is well known.

In step 560, the network device uses the parameters loaded from the configuration profile to register with a registration subsystem. Step 560 may be performed in any of the ways described above, including registering with the registration subsystem 130 to obtain access to network services provided over the communication network 140.

Any of the steps 510-560 may be repeated for subsequent provisioning operations. As mentioned above, subsequent provisioning operations may be initiated by the provisioning subsystem 120. In such cases, steps 520-560 may be performed by a network device being configured.

If a match is not found in step 540, processing continues at step 570. In step 570, the configuration profile is prevented from being loaded. Step 570 may be performed in any of the ways described above, including the configuration module 255 triggering an error.

The above-described exemplary systems and methods are able to securely configure network devices in a cost-effective way, while protecting subscribers and service providers from intruder attacks, including man-in-the-middle theft of service attacks.

V. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
   a provisioning subsystem to:
      incorporate, in a configuration profile, a first parameter associated with a network device, said configuration profile including one or more other parameters for provisioning said network device to access at least one service provided over a communication network, said first parameter comprising at least one of a Media Access Control (MAC) address, a manufacturer name, or a model identifier associated with said network device,
      encrypt said configuration profile including said first parameter,
      receive a request for said encrypted configuration profile from said network device,
      identify, from data included in said request, said encrypted configuration profile that includes said first parameter associated with said network device, and
      provide, via said communication network, said encrypted configuration profile to said network device, said configuration profile being loaded in said network device to provision said network device to access said at least one service provided over said communication network,
      where said encrypted configuration profile is provided to said network device in response to identifying said encrypted configuration profile.

2. The system of claim 1, where said network device is to:
   decrypt said encrypted configuration profile; and
   verify that said configuration profile is intended for said network device.

3. The system of claim 1, where said data, included in said request, includes derived data that has been derived from internal data of said network device, said provisioning subsystem identifying said configuration profile including said first parameter based on the derived data.

4. The system of claim 1, where said provisioning subsystem is further to:
   receive an activation request for activation of said network device;
   identify said first parameter from data included in said activation request; and
   generate said configuration profile based on said data included in said activation request.

5. The system of claim 1, where said provisioning subsystem is to incorporate said first parameter in said configuration profile by inserting said first parameter in a predefined field of said configuration profile.

6. The system of claim 1, where said network device includes a decryption key, said network device to use said decryption key to decrypt said encrypted configuration profile.

7. The system of claim 1, where said provisioning subsystem is to provide a subsequent encrypted configuration profile to said network device, said subsequent encrypted configuration profile including data representative of said first parameter.

8. The system of claim 1, where said first parameter further comprises a serial number associated with said network device.

9. The system of claim 2, where said network device includes internal data, said network device to verify that said configuration profile is intended for said network device by determining whether said first parameter, included in said configuration profile, matches said internal data.

10. The system of claim 6, where said provisioning subsystem is associated with one or more other network devices via said communication network, each of said one or more other network devices including said decryption key, and
   where said provisioning subsystem is further to:
      encrypt a second configuration profile for provisioning a particular network device, of said one or more other network devices, to access at least a second service provided over said communication network, said second encrypted configuration profile including a second parameter, associated with said particular network device, that is different than said first parameter associated with said network device, and
      provide said second encrypted configuration profile to said particular network device, said second encrypted configuration profile to be decrypted by said particular network device using said decryption key.

11. The system of claim 7, where said network device is to:
decrypt said subsequent encrypted configuration profile into a subsequent configuration profile; and
verify that said data representative of said first parameter, included in said subsequent configuration profile, matches internal data of said network device.

12. The system of claim 9, where said network device is to:
load said configuration profile when said first parameter, included in said configuration profile, matches said internal data; and
prevent said configuration profile from being loaded when said first parameter, included in said configuration profile, does not match said internal data.

13. A method comprising:
receiving an encrypted configuration profile at a network device, said encrypted configuration profile including a first parameter and one or more other parameters for provisioning said network device to access at least one service provided over a communication network, said first parameter comprising at least one of a Media Access Control (MAC) address, a manufacturer name, or a model identifier associated with said network device;
decrypting, using said network device, said encrypted configuration profile;
determining, using said network device, whether said first parameter, included in said configuration profile, matches internal data included in said network device to verify that said configuration profile is intended for said network device;
loading, using said network device, said configuration profile when said first parameter, included in said configuration profile, matches said internal data; and
preventing, using said network device, said configuration profile from being loaded when said first parameter, included in said configuration profile, does not match said internal data.

14. The method of claim 13, further comprising:
using a derivation heuristic to derive data from said internal data;
including said derived data in a request; and
sending said request from said network device to a provisioning subsystem to obtain said encrypted configuration profile,
where said encrypted configuration profile is received in response to sending said request.

15. The method of claim 13, further comprising:
receiving a subsequent encrypted configuration profile, at said network device, said subsequent encrypted configuration profile including data representative of said first parameter;
decrypting said subsequent encrypted configuration profile into a subsequent configuration profile; and
verifying that said data representative of said first parameter, included in said subsequent configuration profile, matches internal data included in said network device.

16. A method comprising:
receiving, at a server device and from a user associated with a network device, an activation request for activating said network device;
identifying, using said server device, from data included in said activation request, a first parameter associated with said network device, said first parameter including at least one of a Media Access Control (MAC) address, a manufacturer name, or a model identifier associated with said network device;
generating, using said server device, a configuration profile including one or more parameters for provisioning said network device to access at least one service provided over a communication network;
incorporating, using said server device, said first parameter in said configuration profile;
encrypting, using said server device, said configuration profile including said first parameter;
receiving, using said server device, from said network device, a provisioning request for said encrypted configuration profile;
identifying, using said server device and based on data included in said provisioning request, said encrypted configuration profile; and
providing, using said server device, said encrypted configuration profile to said network device, said encrypted configuration profile to be decrypted by said network device and said decrypted configuration profile to be loaded in said network device to provision said network device to access said at least one service provided over said communication network.

17. The method of claim 16, where generating said configuration profile comprises:
generating said configuration profile based on information included in said activation request.

18. The method of claim 16, where incorporating said first parameter in said configuration profile includes inserting said first parameter in a predefined field of said configuration profile.

19. The method of claim 16, further comprising providing a subsequent encrypted configuration profile to said network device, said subsequent encrypted configuration profile including data representative of said first parameter.

20. The method of claim 16, further comprising:
receiving another request for said configuration profile from said network device; and
identifying, from data included in said other request, said configuration profile.

21. A device comprising:
a provisioning module to:
generate a configuration profile including one or more parameters for provisioning a network device to access at least one service provided over a communication network, and
incorporate, in said configuration profile, a first parameter associated with said network device, said first parameter comprises at least one of a Media Access Control (MAC) address, a manufacturer name, or a model identifier associated with said network device;
an encryption module to encrypt said configuration profile including said first parameter; and
a communications interface to receive, from said network device, a request for said configuration profile,
where said provisioning module is further to identify, from data included in said request, said encrypted configuration profile including said first parameter,
where said communications interface is further to provide said encrypted configuration profile, including said first parameter, to said network device, over a communication network, to provision said network device to access said at least one service provided over said communication network, and where said encrypted configuration profile is provided to said network device in response to the provisioning module identifying said encrypted configuration profile.

22. The device of claim 21, where said communications interface is to provide, periodically or in response to predefined events, subsequent encrypted configuration profiles to one or more other network devices, said predefined events including at least one of one or more updates to configuration profiles associated with said one or more other network devices.

23. The device of claim 21, where said request includes derived data, the derived data being derived, from internal data included in said network device, using a derivation heuristic, and
where said provisioning module uses one of
a reverse derivation heuristic and said derived data to identify said first parameter, or
said reverse derivation heuristic and said first parameter to verify said derived data.

24. A device comprising:
a communications interface to receive an encrypted configuration profile over a communication network, said encrypted configuration profile including a first identifier, said first identifier comprising at least one of a Media Access Control (MAC) address, a manufacturer name, or a model identifier associated with a network device;
a memory including a decryption module and a configuration module; and
a processor to:
decrypt, using one or more instructions from said decryption module, said encrypted configuration profile to obtain a decrypted configuration profile, and
verify, using one or more instructions from said configuration module and based on said first identifier, that said decrypted configuration profile is intended for said device,
where, when verifying that said decrypted configuration profile is intended for said device, the processor is to:
determine whether said first identifier, included in said decrypted configuration profile, matches internal data included in said device.

25. The device of claim 24, where said processor is further to:
load said decrypted configuration profile when said first identifier, included in said decrypted configuration profile, matches said internal data; and
prevent said decrypted configuration profile from being loaded when said first identifier, included in said decrypted configuration profile, does not match said internal data.

26. The device of claim 24, where said processor is further to:
send a request to obtain said encrypted configuration profile, and
where said encrypted configuration profile is received in response to sending said request.

27. The device of claim 24, where said encrypted configuration profile provisions said device to access at least one service provided over said communication network.

* * * * *